US011423548B2

United States Patent
Grauman et al.

(10) Patent No.: US 11,423,548 B2
(45) Date of Patent: Aug. 23, 2022

(54) SEGMENTING GENERIC FOREGROUND OBJECTS IN IMAGES AND VIDEOS

(71) Applicant: Board of Regents, The University of Texas System, Austin, TX (US)

(72) Inventors: Kristen Grauman, Austin, TX (US); Suyog Dutt Jain, Austin, TX (US); Bo Xiong, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 72 days.

(21) Appl. No.: 16/476,287

(22) PCT Filed: Dec. 5, 2017

(86) PCT No.: PCT/US2017/064624
§ 371 (c)(1),
(2) Date: Jul. 6, 2019

(87) PCT Pub. No.: WO2018/128741
PCT Pub. Date: Jul. 12, 2018

(65) Prior Publication Data
US 2019/0355128 A1 Nov. 21, 2019

Related U.S. Application Data

(60) Provisional application No. 62/443,283, filed on Jan. 6, 2017.

(51) Int. Cl.
*G06T 7/194* (2017.01)
*G06T 7/215* (2017.01)
(Continued)

(52) U.S. Cl.
CPC ........... *G06T 7/194* (2017.01); *G06N 3/0454* (2013.01); *G06T 7/11* (2017.01); *G06T 7/143* (2017.01);
(Continued)

(58) Field of Classification Search
CPC . G06T 7/11; G06T 7/143; G06T 7/194; G06T 7/215; G06T 2207/10016;
(Continued)

(56) References Cited

U.S. PATENT DOCUMENTS 10,657,647 B1 * 5/2020 Chen ..................... G06T 7/0046
2003/0223619 A1 12/2003 Stocker et al.
(Continued)

OTHER PUBLICATIONS

Wang et al. "Video object segmentation by Multi-Scale Pyramidial Multi-Dimensional LSTM with generated depth context", 2016 IEEE International Conference on Image Processing (ICIP), pp. 281-285 (Year: 2016).*
(Continued)

*Primary Examiner* — Nay A Maung
*Assistant Examiner* — Jose M Torres
(74) *Attorney, Agent, or Firm* — Robert A. Voigt, Jr.; Shackelford, Bowen, McKinley & Norton, LLP

(57) ABSTRACT

A method, system and computer program product for segmenting generic foreground objects in images and videos. For segmenting generic foreground objects in videos, an appearance stream of an image in a video frame is processed using a first deep neural network. Furthermore, a motion stream of an optical flow image in the video frame is processed using a second deep neural network. The appearance and motion streams are then joined to combine complementary appearance and motion information to perform segmentation of generic objects in the video frame. Generic foreground objects are segmented in images by training a convolutional deep neural network to estimate a likelihood that a pixel in an image belongs to a foreground object. After receiving the image, the likelihood that the pixel in the image is part of the foreground object as opposed to background is then determined using the trained convolutional deep neural network.

27 Claims, 8 Drawing Sheets

(51) Int. Cl.
  *G06T 7/143* (2017.01)
  *G06T 7/11* (2017.01)
  *G06N 3/04* (2006.01)
  *G06V 20/40* (2022.01)
  *G06V 10/82* (2022.01)

(52) U.S. Cl.
  CPC .............. *G06T 7/215* (2017.01); *G06V 10/82* (2022.01); *G06V 20/49* (2022.01); *G06T 2207/10016* (2013.01); *G06T 2207/20076* (2013.01); *G06T 2207/20081* (2013.01); *G06T 2207/20084* (2013.01)

(58) Field of Classification Search
  CPC . G06T 2207/20076; G06T 2207/20081; G06T 2207/20084; G06K 9/00765; G06N 3/0454; H04N 19/21; H04N 19/25; G06V 10/82; G06V 20/49
  See application file for complete search history.

(56) References Cited

U.S. PATENT DOCUMENTS

| | | |
|---|---|---|
| 2005/0169529 A1 | 8/2005 | Owechko et al. |
| 2014/0355861 A1 | 12/2014 | Nirenberg et al. |
| 2016/0052764 A1 | 2/2016 | Fuhrer |
| 2016/0117832 A1* | 4/2016 | Liu .................. G06T 7/215 382/164 |
| 2017/0091951 A1* | 3/2017 | Yoo .................. G06T 7/11 |
| 2017/0236287 A1* | 8/2017 | Shen ............... G06N 3/0454 382/206 |
| 2017/0255832 A1* | 9/2017 | Jones .............. G06N 3/0454 |
| 2017/0337693 A1* | 11/2017 | Baruch ............. G06T 7/194 |

OTHER PUBLICATIONS

Khosla et al., "A neuromorphic system for video object recognition", Frontiers in computational neuroscience, vol. 8, article 147, Nov. 28, 2014, pp. 1-12 (Year: 2014).*

International Search Report for International Application No. PCT/US2017/064624 dated Apr. 6, 2018, pp. 1-4.

Written Opinion of the International Searching Authority for International Application No. PCT/US2017/064624 dated Apr. 6, 2018, pp. 1-5.

Xiong et al., "Pixel Objectness: Learning to Segment Generic Objects Automatically in Images and Videos," IEEE Transactions on Pattern Analysis and Machine Intelligence, Dec. 18, 2018, pp. 1-27.

Jain et al., "FusionSeg: Learning to Combine Motion and Appearance for Fully Automatic Segmentation of Generic Objects in Videos," Apr. 12, 2017, pp. 1-12.

* cited by examiner

SEGMENTING GENERIC FOREGROUND OBJECTS IN IMAGES AND VIDEOS

CROSS REFERENCE TO RELATED APPLICATIONS

This application claims priority to U.S. Provisional Patent Application Ser. No. 62/443,283, entitled "Segmenting Generic Foreground Objects in Images and Videos," filed on Jan. 6, 2017, which is incorporated by reference herein in its entirety.

GOVERNMENT INTERESTS

This invention was made with government support under Grant No. N00014-12-1-0754 awarded by the Office of Naval Research. The U.S. government has certain rights in the invention.

TECHNICAL FIELD

The present invention relates generally to object segmentation, and more particularly to segmenting generic foreground objects in images and videos.

BACKGROUND

Foreground object segmentation is a fundamental vision problem with a wide variety of applications. For example, a visual search system can use foreground segmentation to focus on the important objects in the query image, ignoring background clutter that can adversely affect the search. Object segmentation is also a prerequisite in graphics applications, such as rotoscoping, image retargeting, and 3D-reconstruction. Knowing the spatial extent of objects can also benefit downstream vision tasks, such as scene understanding, caption generation, and summarization. In any such setting, it is crucial to segment "generic" objects in a category-independent manner. That is, the system must be able to identify object boundaries for objects it has never encountered during training.

Today there are two main strategies for generic object segmentation: saliency and object proposals. Both strategies capitalize on properties that can be learned from images and generalize to unseen objects (e.g., well-defined boundaries, differences with surroundings, shape cues, etc.). Saliency methods identify regions likely to capture human attention. They yield either highly localized attention maps or a complete segmentation of the prominent object. Saliency focuses on regions that stand out, which is not the case for all foreground objects.

Alternatively, object proposal methods learn to localize all objects in an image, regardless of their category. Proposal methods aim to obtain high recall at the cost of low precision, i.e., they must generate a large number of object proposals (typically thousands) to accurately cover all objects in an image. This usually involves a multistage process: first bottom-up segments are extracted, then they are scored by their degree of "objectness." Relying on bottom-up segments can be limiting, since low-level cues may fail to pull out contiguous regions for more complex objects. Furthermore, in practice, the scores produced by proposal methods are not so reliable such that one can rely exclusively on the top few proposals.

In video object segmentation, the task is to separate out foreground objects from the background across all frames. This entails computing dense pixel level masks for foreground objects, regardless of the object's category—i.e., learned object-specific models must not be assumed. A resulting foreground object segment is a spatio-temporal tube delineating object boundaries in both space and time. This fundamental problem has a variety of applications, including high level vision tasks, such as activity and object recognition, as well as graphics areas, such as post production video editing and rotoscoping.

In recent years, video object segmentation has received significant attention, with great progress on fully automatic algorithms (without any human involvement). Forgoing manual annotations could scale up the processing of video data, yet it remains a very challenging problem. Automatic algorithms not only need to produce accurate space-time boundaries for any generic object but also need to handle challenges, such as occlusions, shape changes, and camera motion.

While appearance alone drives segmentation in images, videos provide a rich and complementary source of information in the form of object motion. It is natural to expect that both appearance and motion should play a key role in successfully segmenting objects in videos. However, existing methods fall short of bringing these complementary sources of information together in a unified manner.

In particular today, motion is employed for video segmentation in two main ways. On the one hand, the propagation or interactive techniques strongly rely on appearance information stemming from human-drawn outlines on frames in the video. Here motion is primarily used to either propagate information or enforce temporal consistency in the resulting segmentation. On the other hand, fully automatic methods strongly rely on motion to seed the segmentation process by locating possible moving objects. Once a moving object is detected, appearance is primarily used to track it across frames. Such methods can fail if the object(s) are static or when there is significant camera motion. In either paradigm, results suffer because the two essential cues are treated only in a sequential or disconnected way.

SUMMARY

In one embodiment of the present invention, a method for segmenting generic objects in videos comprises processing, by a processor, an appearance stream of an image in a frame of a video using a first deep neural network. The method further comprises processing, by the processor, a motion stream of an optical flow image in the frame of the video using a second deep neural network. The method additionally comprises joining the appearance stream and the motion stream to combine complementary appearance and motion information to perform video segmentation of generic objects in the frame of the video.

Other forms of the embodiment of the method described above are in a system and in a computer program product.

In another embodiment of the present invention, a method for segmenting generic objects in images comprises training, by a processor, a convolutional deep neural network to estimate a likelihood that a pixel in an image belongs to a foreground object. The method further comprises receiving the image. The method additionally comprises determining, by the processor, the likelihood that the pixel in the image is part of the foreground object as opposed to background using the trained convolutional deep neural network.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
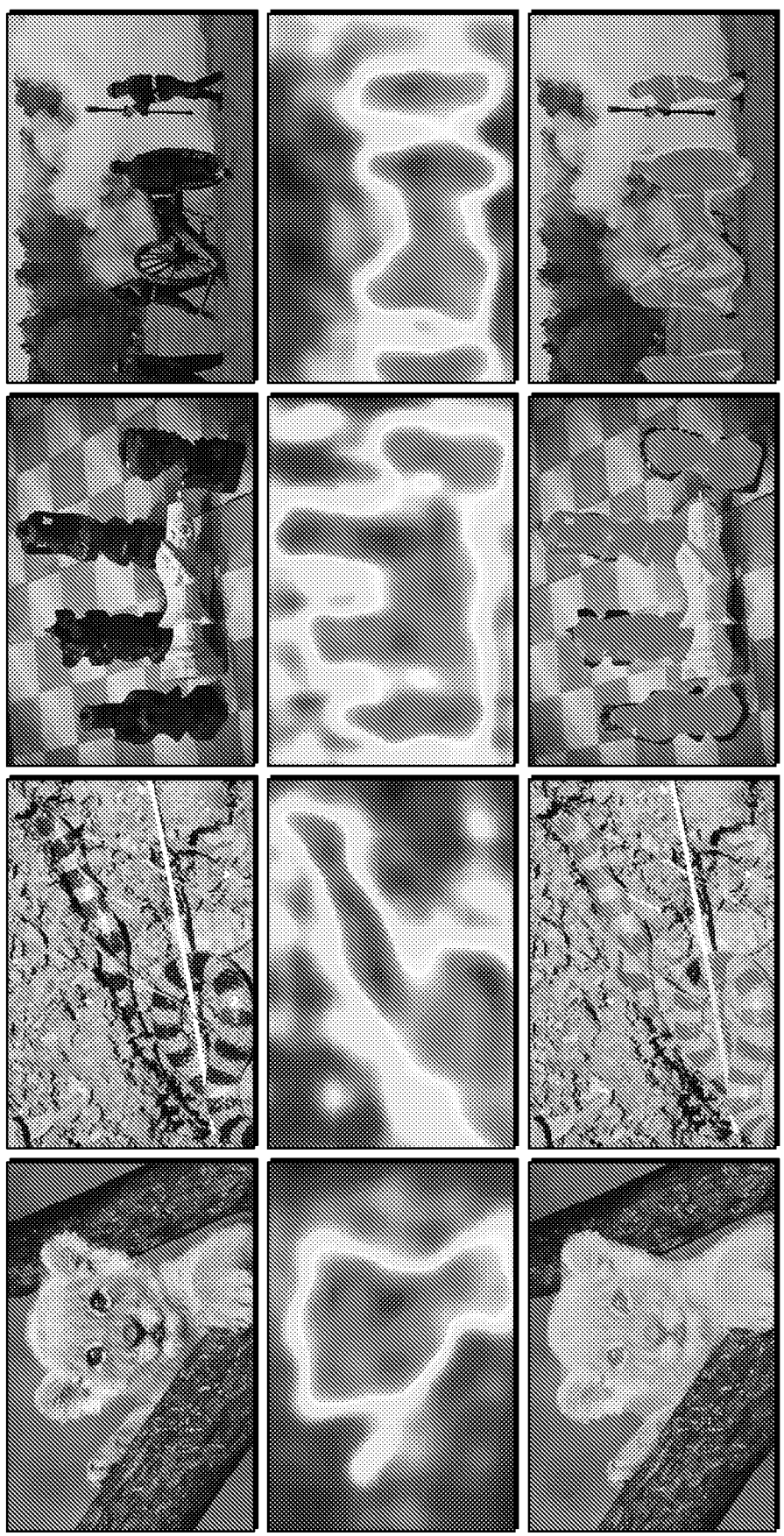
FIG. 1 illustrates an objectness map for each pixel ($2^{nd}$ row) of an image ($1^{st}$ row) and a single foreground segmentation ($3^{rd}$ row) in accordance with an embodiment of the present invention.

The principles of the present invention provide a new approach to generic foreground segmentation. Given a novel image, the goal is to determine the likelihood that each pixel is part of a foreground object (as opposed to background or "stuff" classes, such as grass, sky, sidewalks, etc.). Pixel objectness quantifies how likely a pixel belongs to an object of any class, and should be high even for objects unseen during training. For example, as shown in FIG. 1, which illustrates an objectness map for each pixel ($2^{nd}$ row) of an image ($1^{st}$ row) and a single foreground segmentation ($3^{rd}$ row) in accordance with an embodiment of the present invention, the goal of the present invention is to predict an objectness map for each pixel ($2^{nd}$ row) and a single foreground segmentation ($3^{rd}$ row). The present invention is able to accurately handle objects with occlusion, thin objects with similar colors to background, man-made objects and multiple objects. The approach of the present invention is class-independent. That is, the approach of the present invention is not trained to detect the particular objects in the images.

The present invention casts foreground object segmentation as a unified structured learning problem, and implements it by training a deep fully convolutional network to produce dense (binary) pixel label maps. Given the goal to handle arbitrary objects, one might expect to need ample foreground-annotated examples across a vast array of categories to learn the generic cues. However, when training with explicit boundary-level annotations for few categories pooled together into a single generic "object-like" class, pixel objectness generalizes well to thousands of unseen objects. This generalization ability is facilitated by an implicit image-level notion of objectness built into a pre-trained classification network, which is transferred to the segmentation model of the present invention during initialization.

Such a formulation has some key advantages. First, the present invention is not limited to segmenting objects that stand out conspicuously, as is typically the case in salient object detection. Second, it is not restricted to segmenting only a fixed number of object categories, as is the case for so-called supervised semantic segmentation methods. Third, rather than divide processing into two independent steps—as is typical in today's region-based object proposals—the present invention unifies learning "what makes a good region" with learning "which pixels belong in a region together." As such, unlike the two-stage proposal methods, it is not beholden to whatever flawed regions some bottom-up segmenter might produce.

Figure 2:
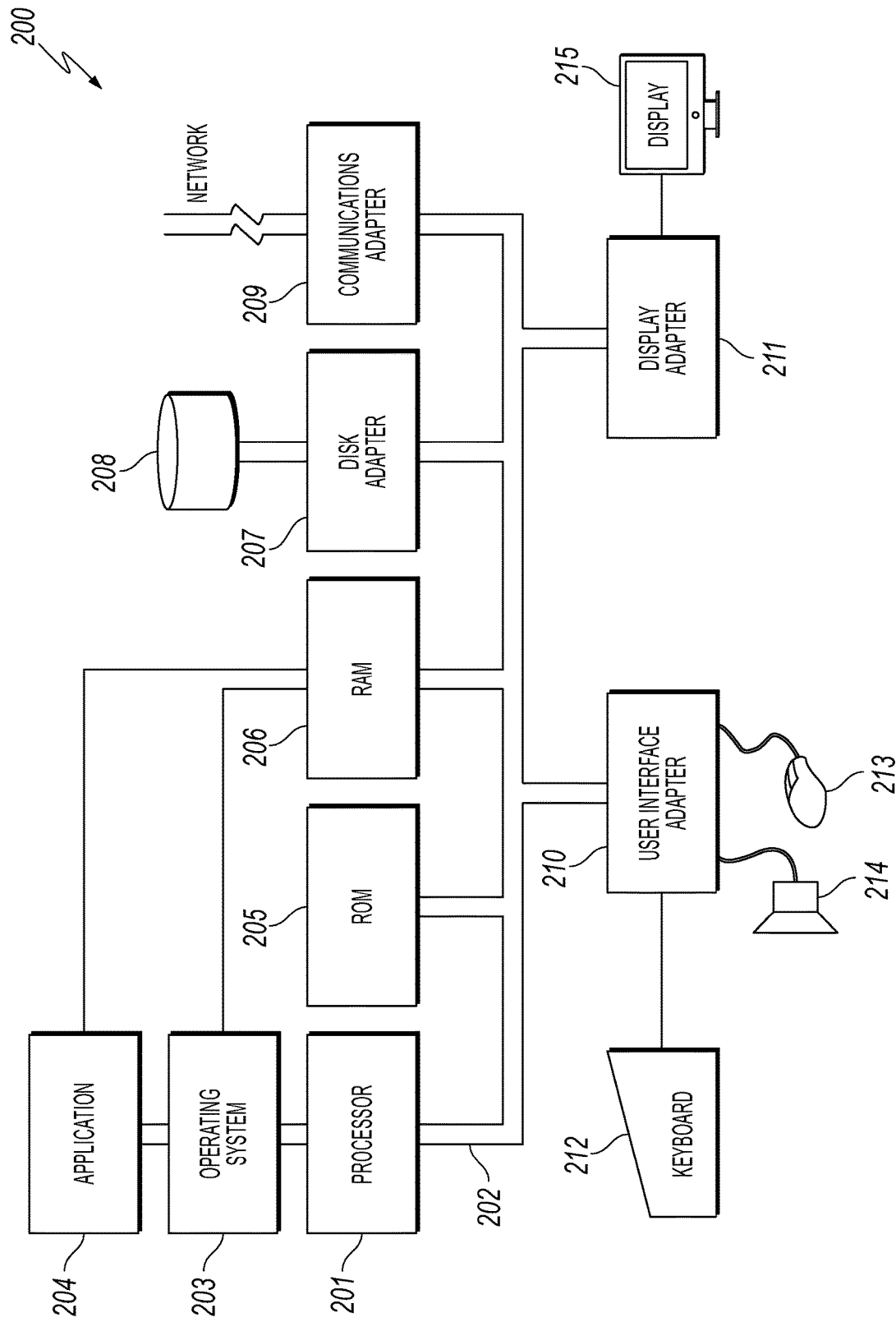
FIG. 2 illustrates a hardware configuration of a visual processing system which is representative of a hardware environment for practicing the present invention.

Referring now to the Figures in detail, FIG. 2 illustrates a hardware configuration of visual processing system 200 which is representative of a hardware environment for practicing the present invention. Visual processing system 200 may be any type of computing device (e.g., portable computing unit, Personal Digital Assistant (PDA), smartphone, laptop computer, mobile phone, desktop computer system, workstation, and the like) configured with the capability of segmenting generic foreground objects in images and videos. Referring to FIG. 2, visual processing system 200 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, an application for segmenting generic foreground objects in images and videos as discussed below in association with FIGS. 3-5, 6A-6B and 7.

Referring again to FIG. 2, read-only memory ("ROM") 205 may be coupled to system bus 202 and include a basic input/output system ("BIOS") that controls certain basic functions of visual processing system 200. Random access memory ("RAM") 206 and disk adapter 207 may also be coupled to system bus 202. It should be noted that software components including operating system 203 and application 204 may be loaded into RAM 206, which may be visual processing system's 200 main memory for execution. Disk adapter 207 may be an integrated drive electronics ("IDE") adapter that communicates with a disk unit 208, e.g., disk drive. It is noted that the program for segmenting generic foreground objects in images and videos as discussed below in association with FIGS. 3-5, 6A-6B and 7, may reside in disk unit 208 or in application 204.

Visual processing system 200 may further include a communications adapter 209 coupled to bus 202. Communications adapter 209 may interconnect bus 202 with an outside network thereby allowing computing device 200 to communicate with other devices.

I/O devices may also be connected to visual processing system 200 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to visual processing system 200 through keyboard 212 or mouse 213 and receiving output from visual processing system 200 via display 215 or speaker 214. Other input mechanisms may be used to input data to visual processing system 200 that are not shown in FIG. 2, such as display 215 having touch-screen capability and keyboard 212 being a virtual keyboard. Visual processing system of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, the goal of the present invention is to design a model that can predict the likelihood of each pixel being a generic foreground object as opposed to background. Such a task may be referred to herein as "pixel objectness." Such a term is used to distinguish from the related problems of salient object detection (which seeks only the most attention-grabbing foreground object) and region proposals (which seeks a ranked list of candidate object-like regions). Pixel objectness is posed as a dense labeling problem and a solution is proposed based on a convolutional neural network architecture that supports end-to-end training as discussed below in connection with FIG. 3.

Figure 3:
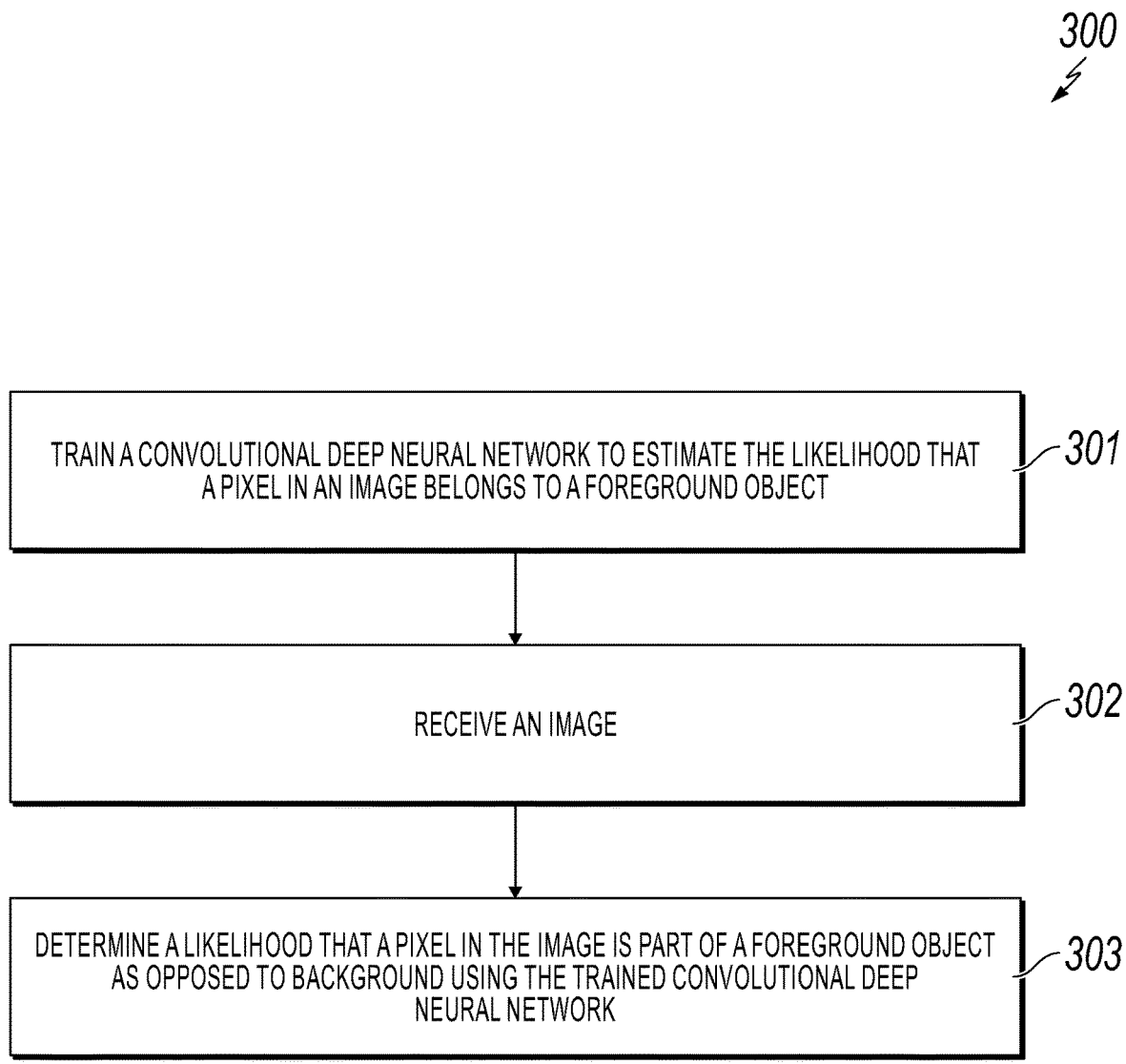
FIG. 3 is a flowchart of a method for segmenting generic foreground objects in images in accordance with an embodiment of the present invention.

FIG. 3 is a flowchart of a method 300 for segmenting generic foreground objects (i.e., finding boundaries of generic foreground objects) in images in accordance with an embodiment of the present invention.

Referring to FIG. 3, in conjunction with FIGS. 1-2, in step 301, a convolutional deep neural network is trained with a mix of image-level object category annotations together with images with boundary-level annotations to produce dense binary segmentation maps in order to estimate the likelihood that a pixel in an image belongs to a foreground object.

After receiving an image in step 302, a likelihood that a pixel in the image is part of a foreground object as opposed to background is determined in step 303 using the trained convolutional deep neural network.

A further discussion regarding method 300 is provided below.

In one embodiment, each pixel in an image is labeled as either "object" or "background." Given an image (e.g., Red-Green-Blue (RGB) image) I of size m×n×c as input, the task of foreground object segmentation is formulated as densely labeling each pixel in the image as either "object" or "background." Thus, the output of pixel objectness is a binary map of size m×n.

Since the goal of the present invention is to predict objectness for each pixel, the model of the present invention should 1) predict a pixel-level map that aligns well with object boundaries, and 2) generalize so it can assign high probability to pixels of unseen object categories.

Potentially, one way to address both challenges would be to rely on a large annotated image dataset that contains a large number of diverse object categories with pixel-level foreground annotations. However, such a dataset is non-trivial to obtain. The practical issue is apparent looking at recent large-scale efforts to collect segmented images. They contain boundary-level annotations for merely dozens of categories, and/or for only a tiny fraction of all dataset images. Furthermore, such annotations come at a price—about $400,000 to gather human-drawn outlines on 2.5M object instances from 80 categories assuming workers receive minimum wage. To naively train a generic foreground object segmentation system, one might expect to need foreground labels for many more representative categories, suggesting an alarming start-up annotation cost.

In one embodiment, the system is trained to predict pixel objectness using a mix of explicit boundary-level annotations and implicit image-level object category annotations. From the former, the system will obtain direct information about image cues indicative of generic foreground object boundaries. From the latter, the system will learn object-like features across a wide spectrum of object types—but without being told where those objects' boundaries are.

To this end, a fully convolutional deep neural network is trained for the foreground-background object labeling task in step 301. In one embodiment, the network is initialized using a powerful generic image representation learned from millions of images labeled by their object category, but lacking any foreground annotations. Then, the network is fine-tuned to produce dense binary segmentation maps, using relatively few images with pixel-level annotations originating from a small number of object categories.

Since the pre-trained network is trained to recognize thousands of objects, its image representation has a strong notion of objectness built inside it, even though it never observes any segmentation annotations. Meanwhile, by subsequently training with explicit dense foreground labels, one can steer the method to fine-grained cues about boundaries that the standard object classification networks have no need to capture. This way, even if the model of the present invention is trained with a limited number of object categories having pixel-level annotations, one can expect it to learn generic representations helpful to pixel objectness.

In one embodiment, a deep network structure originally designed for multi-class semantic segmentation is adopted. In one embodiment, the deep network structure is initialized with weights pre-trained on ImageNet, which provides a representation equipped to perform image-level classification for some 1,000 object categories. Next, the dense semantic masks of a modestly sized semantic segmentation dataset are transformed into binary object vs. background masks, by fusing together all its 20 categories into a single super category ("generic object"). Subsequently, the deep network (initialized for ImageNet object classification) is trained to perform well on the dense foreground pixel labeling task. The model of the present invention supports end-to-end training.

Figure 4:
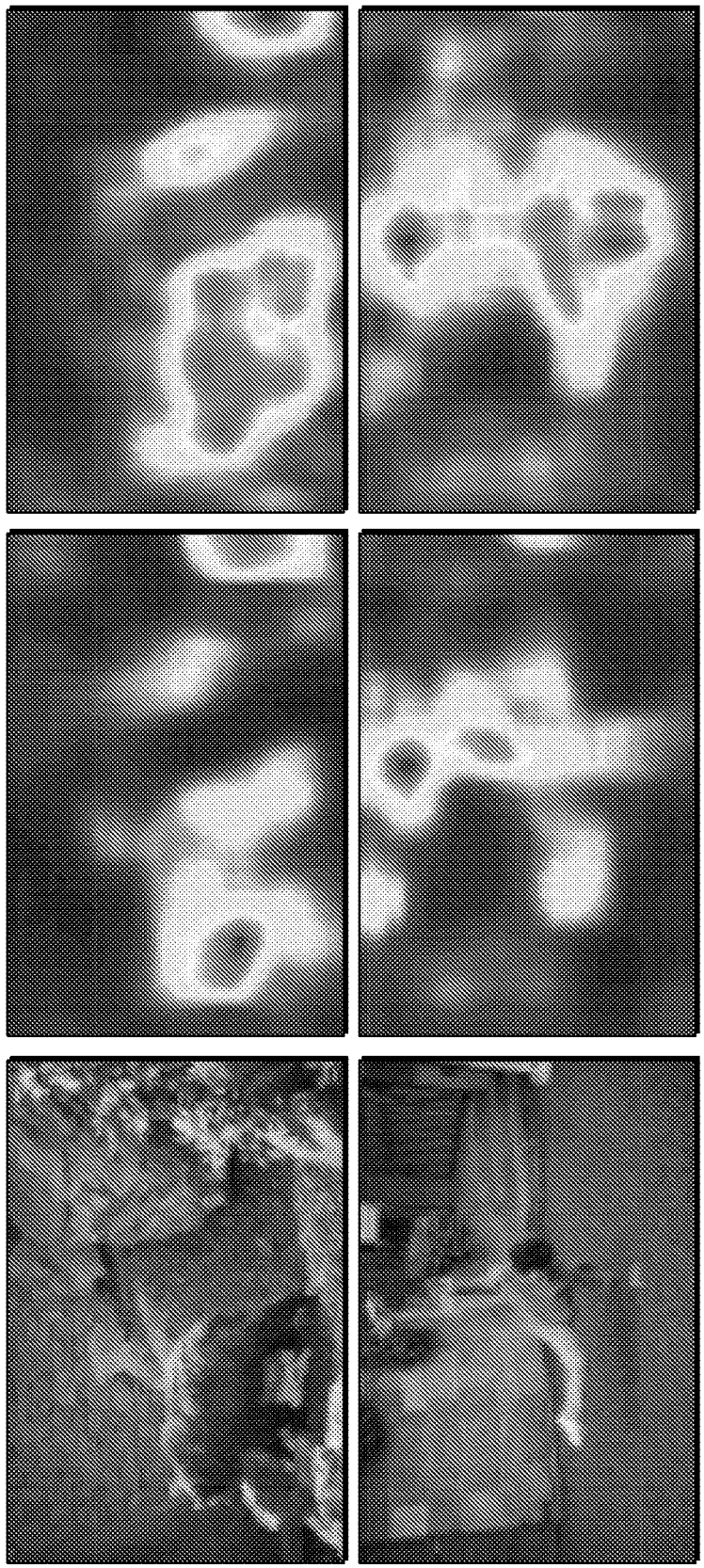
FIG. 4 shows activation maps from a network trained for ImageNet classification (middle) and from the network of the present invention (right), by summing up feature responses from each filter in the last convolutional layer (e.g., pool 5) for each spatial location in accordance with an embodiment of the present invention.

To illustrate this synergy, FIG. 4 shows activation maps from a network trained for ImageNet classification (middle) and from the network of the present invention (right), by summing up feature responses from each filter in the last convolutional layer (e.g., pool 5) for each spatial location in accordance with an embodiment of the present invention. Although networks trained on a classification task never observe any segmentations, they can show high activation responses when object parts are present and low activation responses to stuff-like regions, such as rocks and roads. Since the classification networks are trained with thousands of object categories, their activation responses are rather general. However, they are responsive to only fragments of the objects. After training with explicit dense foreground labels, the network of the present invention is able to extend high activation responses from discriminative object parts to the entire object.

For example, in FIG. 4, the classification network only has a high activation response on the bear's head, whereas, the pixel objectness network of the present invention has a high response on the entire bear body; similarly for the person. This supports the hypothesis that networks trained for classification tasks contain a reasonable but incomplete basis for objectness, despite lacking any spatial annotations. By subsequently training with explicit dense foreground labels, one can steer towards fine-grained cues about boundaries that the standard object classification networks have no need to capture.

In one embodiment, the widely used image classification model Visual Geometry Group (VGG)-16 network is adapted into a fully convolutional network by transforming its fully connected layers into convolutional layers. This enables the network to accept input images of any size and also produce corresponding dense output maps. The network comprises of stacks of convolution layers with max-pooling layers in between. All convolution filters are of size 3×3 except the last convolution layer which comprises 1×1 convolutions. Each convolution layer is also followed by a "ReLU" non-linearity before being fed into the next layer. The 1000-way classification layer is removed from VGG-net and replaced with a 2-way layer that produces a binary mask as output. The loss is the sum of cross-entropy terms over each pixel in the output layer.

The VGG-16 network consists of five max pooling layers. While well suited for classification, this leads to a 32× reduction in the output resolution compared to the original image. In order to achieve more fine-grained pixel objectness map, the "hole" algorithm proposed in Chen et al., "Semantic Image Segmentation with Deep Convolutional Nets and Fully Connected CRFs," ICLR 2015, pp. 1-11, is applied. In particular, this algorithm modifies the VGG-16 architecture by replacing the subsampling in the last two max-pooling layers with atrous convolution. This method is parameter free and results in only a 8× reduction in the output resolution. A bilinear interpolation is then used to recover a foreground map at the original resolution.

Dense pixel objectness has many applications. For example, dense pixel objectness can be used to assist in image retrieval and content-aware image retargeting.

With respect to object-aware image retrieval, pixel objectness foregrounds can assist in image retrieval. A retrieval system accepts a query image containing an object, and then the system returns a ranked list of images that contain the same object. This is a valuable application, for example, to allow object-based online product finding. Typically, retrieval systems extract image features from the entire query image. This can be problematic, however, because it might retrieve images with similar background, especially when the object of interest is relatively small. Pixel objectness may be used to restrict the system's attention to the foreground object(s) as opposed to the entire image. To implement the idea, pixel objectness is run. In order to reduce false positive segmentations, the largest connected foreground region is kept if it is larger than 6% of the overall image area. Then the smallest bounding box is cropped enclosing the foreground segmentation and features are extracted from the entire bounding box. If no foreground is found, the image features are extracted from the entire image. Such a process is applied to both the query and database images. To rank database images, two image representations are explored. The first one uses only the image features extracted from the bounding box, and the second concatenates the features from the original image with those from the bounding box.

As a second application, pixel objectness can enhance image retargeting. The goal is to adjust the aspect ratio or size of an image without distorting its important visual concepts. In one embodiment, the idea is to protect semantically important visual content based on foreground segmentation. To this end, the Seam Carving algorithm is adapted. The energy function is defined based on high-level semantics rather than low-level image features alone. Specifically, pixel objectness is first predicted, and then the gradient energy g is scaled within the foreground segment(s) by $(g+1) \times 2$.

Hence, the present invention involves an end-to-end learning framework for segmenting generic foreground objects in images. Pixel objectness generalizes very well to thousands of unseen object categories. The foreground segmentations produced by the model of the present invention also proved to be highly effective in improving the performance of image-retrieval and image-retargeting tasks, which helps illustrate the real-world demand for high-quality, single image, non-interactive foreground segmentations.

With respect to the deficiencies of video object segmentation discussed in the Background section, the present invention proposes an end-to-end trainable model that draws on the respective strengths of generic (non-category-specific) object appearance and motion in a unified framework. Specifically, the present invention develops a novel two-stream fully convolutional deep segmentation network where individual streams encode generic appearance and motion cues derived from a video frame and its corresponding optical flow. These individual cues are fused in the network to produce a final object versus background pixel-level binary segmentation for each video frame. The proposed approach segments both static and moving objects without any human involvement.

Declaring that motion should assist in video segmentation is non-controversial and has been previously performed. However, thus far the sum is not much greater than its parts since the signal from motion is adequately complex such that rich learned models are necessary to exploit it. For example, a single object may display multiple motions simultaneously, background and camera motion can intermingle, and even small-magnitude motions should be informative.

To learn the rich signals, sufficient training data is needed. However, no large-scale video datasets of pixel level segmentation masks exist. The present invention addresses this practical issue. In one embodiment, the present invention leverages readily available image segmentation annotations together with weakly annotated video data to train the model of the present invention.

The results show the reward of learning from both signals in a unified framework: a true synergy, with substantially stronger results than what can be obtained from either one alone—even if they are treated with an equally sophisticated deep network. The state of the art for fully automatic video object segmentation on multiple challenging datasets is significantly advanced. In some cases, the present invention even outperforms existing methods that require manual intervention.

A description of such an end-to-end learning framework for producing pixel level foreground object segmentation in videos is discussed below in connection with FIG. 5.

Figure 5:
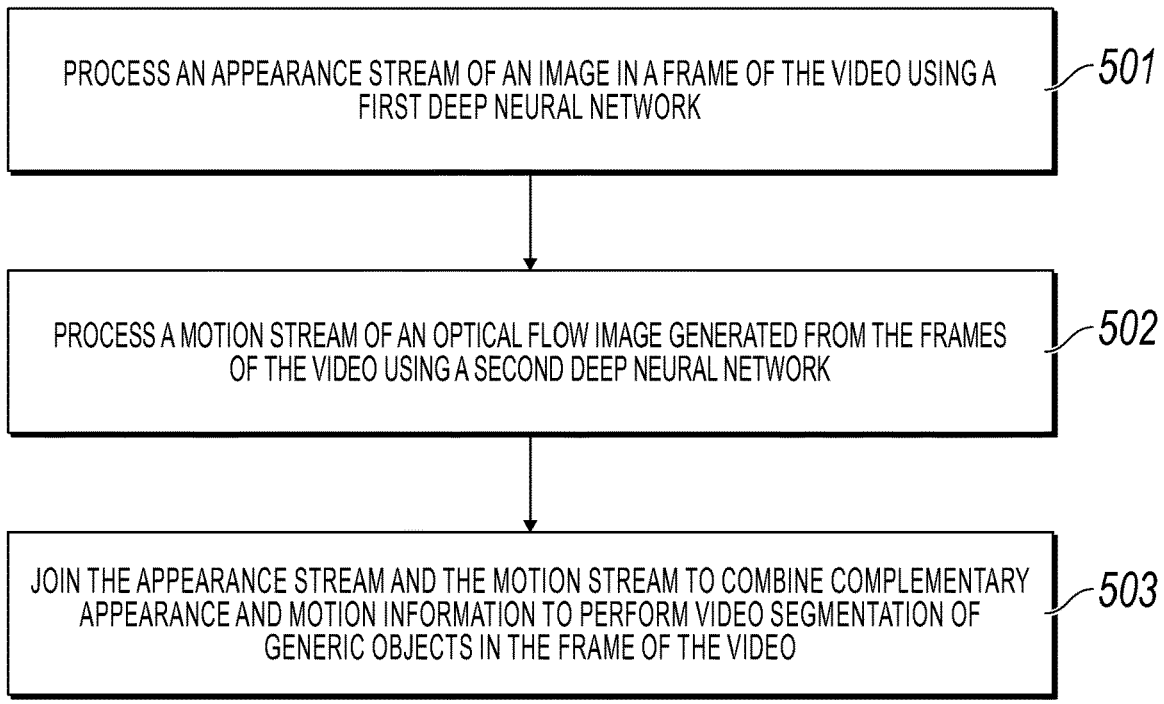
FIG. 5 is a flowchart of a method for segmenting generic foreground objects in videos in accordance with an embodiment of the present invention.

FIG. 5 is a flowchart of a method 500 for segmenting generic foreground objects in videos in accordance with an embodiment of the present invention.

Referring to FIG. 5, in step 501, appearance stream 601 (discussed further below in connection with FIGS. 6A-6B) of an image (e.g., red-green-blue image) in a frame of the video is processed using a first deep neural network.

In step 502, motion stream 602 (discussed further below in connection with FIGS. 6A-6B) of an optical flow image generated from the frames of the video is processed using a second deep neural network. It is noted for clarity that while FIG. 5 illustrates step 502 occurring subsequent to step 501 that each of these steps may be executed substantially concurrently.

In step 503, the appearance and motion streams 601, 602 (discussed further below in connection with FIGS. 6A-6B) are joined to combine complementary appearance and motion information to perform video segmentation of generic objects in the frame of the video.

A more detailed discussion regarding method 500 is provided below.

As previously discussed, the present invention segments generic objects in video, independent of the object categories they belong to, and without any manual intervention. The problem is posed as a dense labeling task: given a sequence of video frames $[I_1, I_2, \ldots, I_N]$, an "object" or "background" is inferred for each pixel in each frame, to output a sequence of binary maps $[S_1, S_2, \ldots, S_N]$. The present invention solves such a problem based on a convolutional neural network.

In one embodiment, a deep fully convolutional network is trained to learn a model of generic foreground appearance. The main idea is to pre-train for object classification, then re-purpose the network to produce binary object segmentations by fine-tuning with relatively few pixel-labeled foreground masks. In one embodiment, the fully connected layers of a Visual Geometry Group (VGG) architecture are transformed into convolutional layers. In one embodiment, the resulting network possesses a strong notion of objectness, making it possible to identify foreground regions of more than 3,000 object categories despite seeing ground truth masks for only 20 during training.

In one embodiment, the image classification model ResNet-101 is adapted by replacing the last two groups of convolution layers with atrous convolution layers (also known as dilated convolution) to increase feature resolution. This results in only an 8× reduction in the output resolution instead of a 32× reduction in the output resolution in the original ResNet model. In order to improve the model's ability to handle both large and small objects, the classification layer of ResNet-101 is replaced with four parallel atrous convolutional layers with different sampling rates to explicitly account for object scale. Then the prediction is fused from all four parallel atrous convolutional layers by summing all the outputs. The loss is the sum of cross-entropy terms over each pixel position in the output layer, where ground truth masks consist of only two labels—object foreground or background. In one embodiment, the model is trained using the Caffe implementation of Chen et al., "Deeplab: Semantic Image Segmentation with Deep Convolutional Nets, Atrous Convolution, and Fully Connected CRFs," 2016, pp. 1-14. The network takes a video frame of arbitrary size and produces an objectness map of the same size as shown in FIGS. 6A-6B.

Figure 6A:
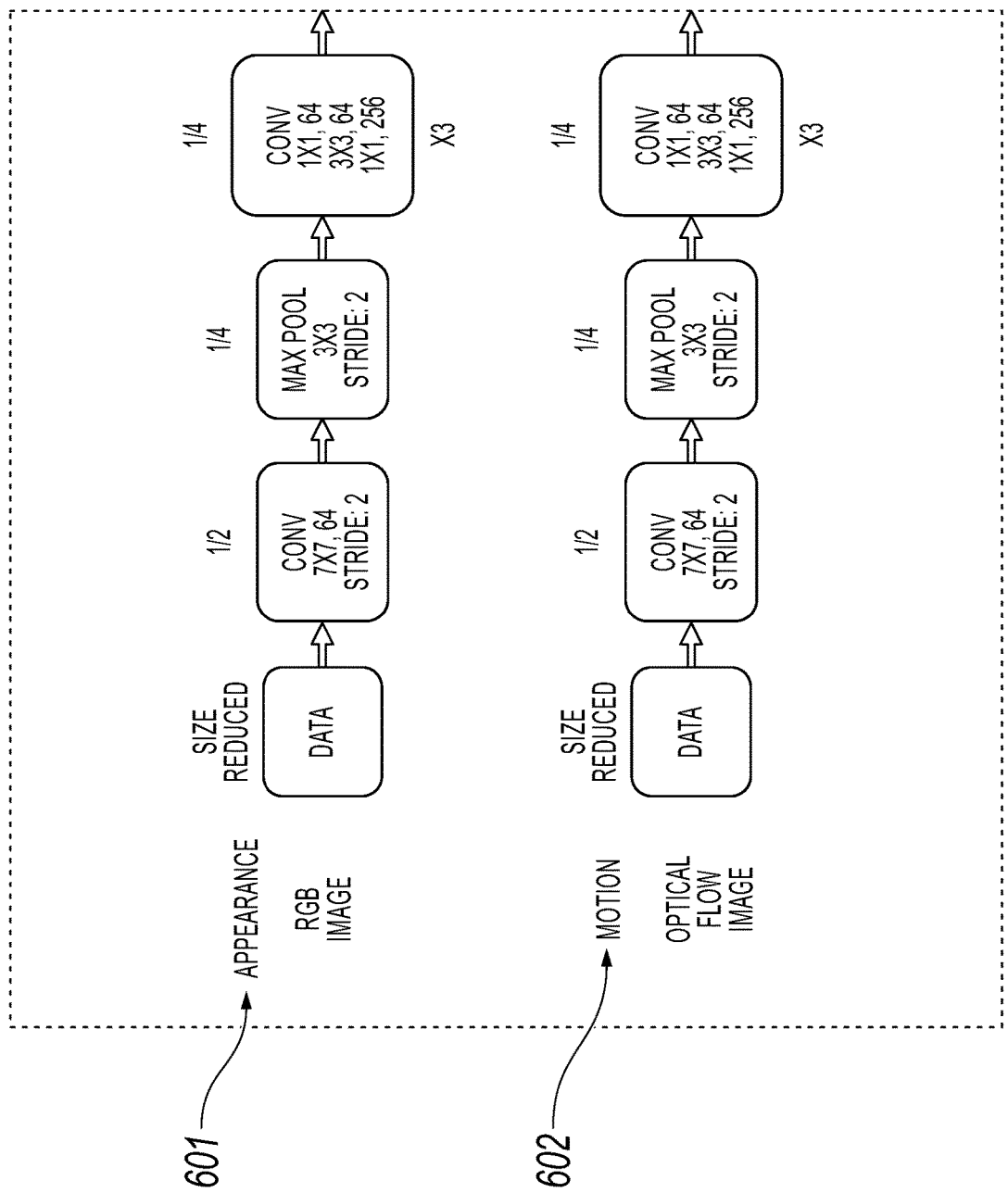
FIGS. 6A-6B illustrate the network structure for the model of the present invention in accordance with an embodiment of the present invention.
Figure 6B:
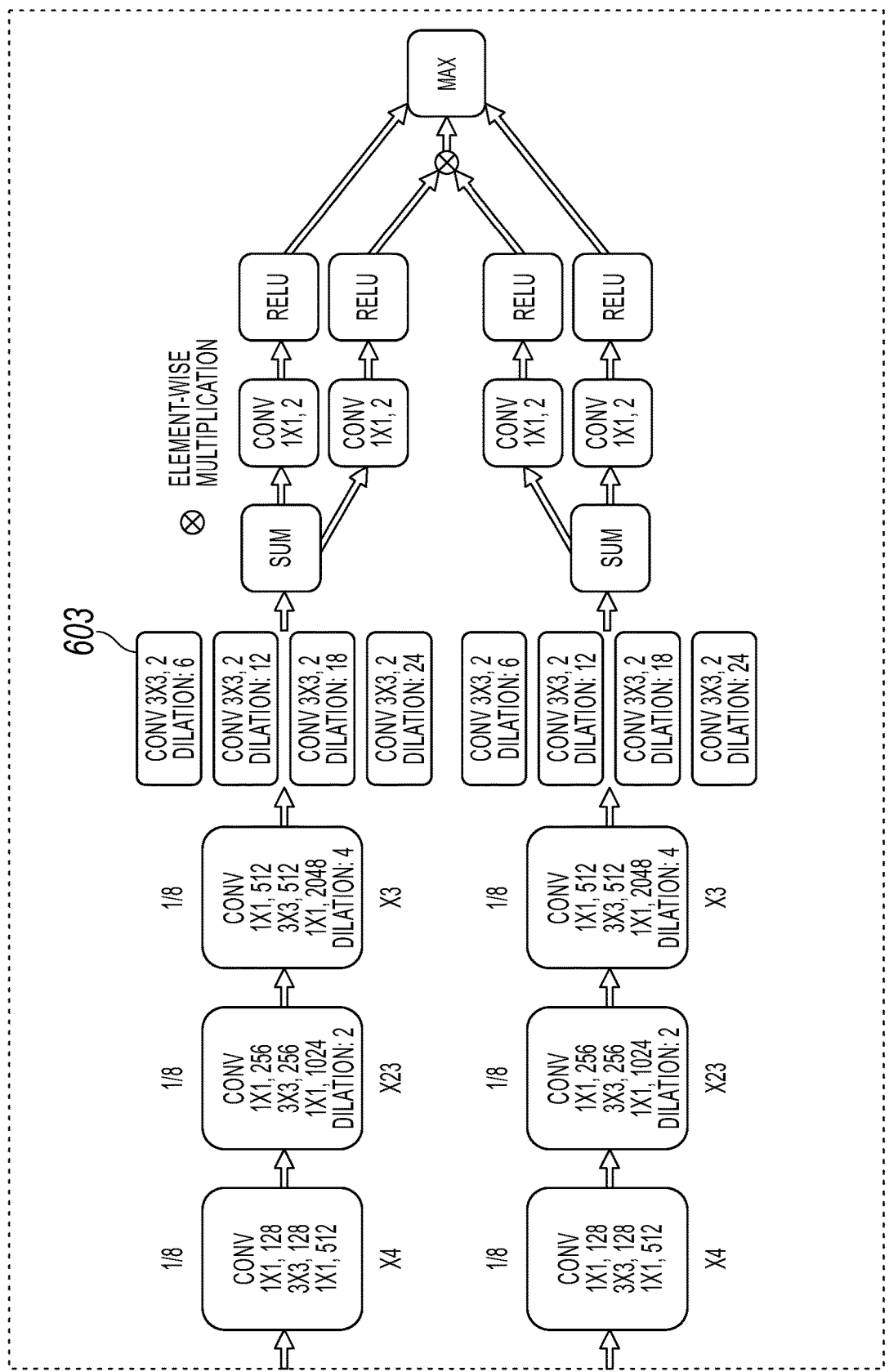

FIGS. 6A-6B illustrate the network structure for the model of the present invention in accordance with an embodiment of the present invention. Referring to FIGS. 6A-6B, each convolutional layer except the first 7×7 convolutional layer and the fusion blocks is a residual block, adapted from ResNet-101.

In one embodiment, the complete video segmentation network architecture consists of a two-stream network in which parallel streams for appearance 601 and motion 602 process the RGB and optical flow images, respectively, then join in a fusion layer 603 as shown in FIGS. 6A-6B.

The direct parallel to the appearance stream discussed above would entail training the motion stream to map optical flow maps to video frame foreground maps. However, an important practical catch to that solution is training data availability. While ground truth foreground image segmentations are at least modestly available, datasets for video object segmentation masks are small-scale in deep learning terms, and primarily support evaluation. For example, Segtrack-v2, one of the most commonly used benchmark datasets for video segmentation, contains only 14 videos with 1066 labeled frames. Semantic video segmentation datasets, such as CamVid or Cityscapes are somewhat larger, yet limited in object diversity due to a focus on street scenes and vehicles. A good training source should have ample frames with human-drawn segmentations on a wide variety of foreground objects, and would show a good mix of static and moving objects. No such large-scale dataset exists and creating one is non-trivial.

The present invention proposes a solution that leverages readily available image segmentation annotations together with weakly annotated video data to train the model of the present invention. In brief, the two streams of the model of the present invention are temporarily decoupled. The appearance stream is allowed to hypothesize likely foreground regions in frames of a large video dataset annotated only by bounding boxes. Since the appearance alone need not produce perfect segmentations in video, a series of filtering stages is devised by which the system zeros in on high quality estimates of the true foreground. These instances bootstrap pre-training of the optical flow stream, and then the two streams are joined (see step 503) to learn the best combination from minimal human labeled training videos.

More specifically, given a video dataset with bounding boxes labeled for each object, the category labels are ignored and the boxes alone are mapped to each frame. Then, the appearance stream is applied, thus far trained only from images labeled by their foreground masks, to compute a binary segmentation for each frame.

Next, the box and segmentation are deconflicted in each training frame. First, the binary segmentation is refined by setting all the pixels outside the bounding box(es) as background. Second, for each bounding box, it is checked if the smallest rectangle that encloses all the foreground pixels overlaps with the bounding box by at least 75%. Otherwise, the segmentation is discarded. Third, regions are discarded where the box contains more than 95% pixels labeled as foreground, based on the prior that good segmentations are rarely a rectangle, and thus probably the true foreground spills out beyond the box. Finally, segments are eliminated where object and background lack distinct optical flow, so the motion model of the present invention can learn from the desired cues. Specifically, the frame's optical flow is computed using C. Liu, "Beyond Pixels: Exploring New Representations and Applications for Motion Analysis," PhD Thesis, 2009, pp. 1-164, which is hereby incorporated by reference herein in its entirety, and converted to an RGB flow image. If the 2-norm between a) the average value within the bounding box and b) the average value in a box whose height and width are twice the original size exceeds 30, the frame and filtered segmentation are added to the training set as shown in FIG. 7.

Figure 7:
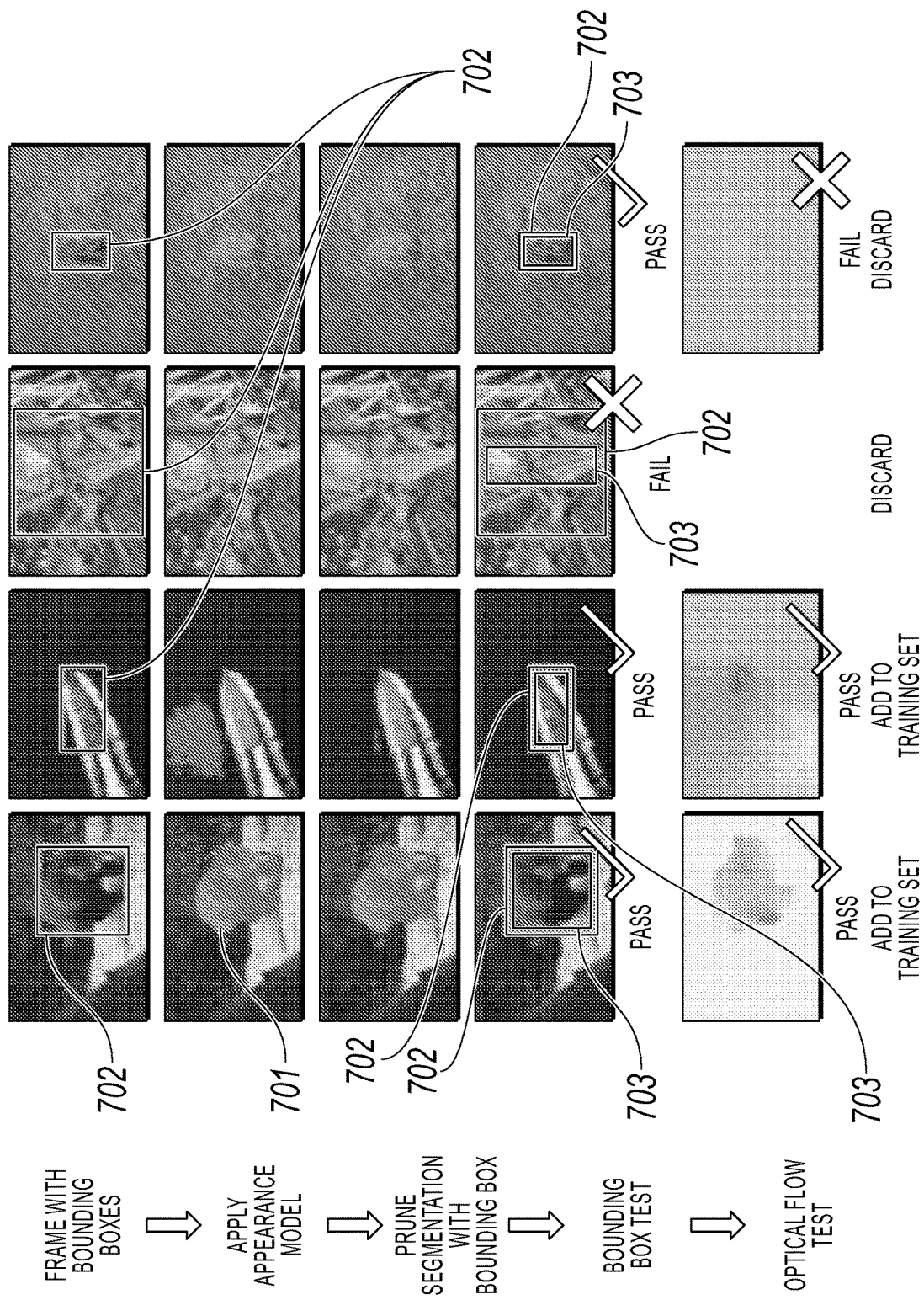
FIG. 7 illustrates the procedures to generate (pseudo)-ground truth segmentations in accordance with an embodiment of the present invention.

FIG. 7 illustrates the procedures to generate (pseudo)-ground truth segmentations in accordance with an embodiment of the present invention. The appearance model is first applied to obtain initial segmentations (second row, with shaded object segment 701) and then prune by setting pixels outside bounding boxes as background (third row). Then, the bounding box test is applied (fourth row, bounding box 702 is ground truth and bounding box 703 is the smallest bounding box enclosing the foreground segment) and optical flow test (fifth row) to determine whether the segmentation is added to the motion stream's training set or discarded.

Hence, bootstrapping from the preliminary appearance model, followed by bounding box pruning, bounding box tests, and the optical flow test, one can generate accurate per-pixel foreground masks for thousands of diverse moving objects—for which no such datasets exist to date. It is noted that by eliminating training samples with these filters, label noise for training may be reduced.

With this data, the motion stream is trained. Analogous to the strong generic appearance model, a strong generic motion mode is trained that can segment foreground objects purely based on motion. In one embodiment, the same network architecture as the appearance model (see FIGS. 6A-6B) is used. The motion model of the present invention takes only optical flow as the input and is trained with automatically generated pixel level ground truth segmentations. In particular, the raw optical flow is converted to a 3-channel (RGB) color-coded optical flow image. The color-coded optical flow image is used as the input to the motion network. The network is again initialized with pre-trained weights from ImageNet classification. Representing optical flow using RGB flow images allows one to leverage the strong pre-trained initializations as well as maintain symmetry in the appearance and motion arms of the network.

An alternative solution might forgo handing the system optical flow, and instead input two raw consecutive RGB frames. However, doing so would likely demand more training instances in order to discover the necessary cues. Another alternative would directly train the joint model that combines both motion and appearance, whereas, each stream is first "pre-trained" to make it discover convolutional features that rely on appearance or motion alone, followed by a fusion layer (below). The design choices of the present invention are rooted in avoiding bias in training the model of the present invention. Since the (pseudo) ground truth comes from the initial appearance network, either supplying two consecutive RGB frames or training jointly from the onset is liable to bias the network to exploit appearance at the expense of motion. By feeding the motion model with only optical flow, the motion stream is ensured to learn to segment objects from motion.

In one embodiment, an object segmentation prediction is reliable if 1) either the appearance model or the motion model predicts the object segmentation with very strong confidence; and 2) both the appearance model and the motion model predict the segmentation.

In one embodiment, the network structure of the joint model is implemented by creating three independent parallel branches: 1) apply a 1×1 convolution layer followed by implementing a rectified linear unit (ReLU) to the output of the appearance model; 2) apply a 1×1 convolution layer followed by implementing a ReLU to the output of the motion model; and 3) replicate the structure of the first and second branches and apply element-wise multiplication on their outputs. The element-wise multiplication ensures the third branch outputs confident predictions of object segmentation if and only if both the appearance model and the motion model have strong predictions. Finally, a layer is applied that takes the element-wise maximum to obtain the final prediction as shown in FIGS. 6A-6B.

As discussed above, the two streams are not fused in an early stage of the networks so that both of the steams have strong independent predictions. Another advantage of the approach of the present invention is to only introduce six additional parameters in each 1×1 convolution layer, for a total of 24 trainable parameters. The fusion model can then be trained with very limited annotated video data, without overfitting.

Hence, the present invention provides the first deep learning framework for video object segmentation, and a means to train deep video segmentation models with weakly labeled video and strongly labeled images. A new approach has been developed for learning to segment generic objects in video that 1) achieves deeper synergy between motion and appearance and 2) addresses practical challenges in training a deep network for video segmentation. Results show sizeable improvements over many existing methods—in some cases, even those requiring human intervention.

By utilizing the present invention, thousands of object categories can be generalized which makes it widely applicable for segmenting objects in images and videos at a large scale. Existing methods are either restricted in their performance or provide good results only for a fixed number of object categories. For video segmentation, the present invention learns to combine both appearance and motion in a principled way. Existing methods do not make an effective use of both the cues in a unified way. Furthermore, the present invention is very efficient to run, and can process each image within 2-3 seconds. For videos, a frame can be processed in about 10 seconds. Existing methods, especially for video segmentation can take up to a minute to process each frame.

Furthermore, the present invention enables object boundaries in images and videos to be identified which is very useful for several higher level image and video understanding tasks, such as search, scene interpretation, editing, recognition, etc.

The models of the present invention discussed above can be used in several different applications. For example, this can lead to a better understanding of static and dynamic scenes by isolating important and prominent objects while ignoring the unimportant background details. Furthermore, visual search and retrieval can be improved by focusing only of important objects during the matching process and relevance judgments. Additionally, the training data generation and annotation process can be accelerated by generating strong priors over regions which contain objects and thus require human annotation. Such hybrid systems can result in large savings in annotation costs. Furthermore, image editing and retargeting can be enhanced by assigning more importance to regions which are more object-like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for segmenting generic objects in videos, the method comprising:
   processing, by a processor, an appearance stream of an image in a frame of a video using a first deep neural network;
   processing, by said processor, a motion stream of an optical flow image in said frame of said video using a second deep neural network; and
   joining said processed appearance stream and said processed motion stream to combine complementary appearance and motion information to perform video segmentation of generic objects in said frame of said video.

2. The method as recited in claim 1 further comprising:
   receiving annotations of a foreground map; and using said appearance stream to generate a more precise version of said foreground map to be used as training data.

3. The method as recited in claim 1 further comprising:
mapping bounding boxes labeled for each generic object to each frame of said video; and
applying said appearance stream to said mapped bounding boxes to compute a binary segmentation for each frame of said video.

4. The method as recited in claim 3 further comprising:
deconflicting said mapped bounding boxes and said binary segmentation in each frame of said video.

5. The method as recited in claim 3 further comprising:
refining said binary segmentation by setting all pixels outside said bounding boxes as background.

6. The method as recited in claim 3 further comprising:
determining if a smallest rectangle that encloses all foreground pixels overlaps with a bounding box by at least a threshold percentage.

7. The method as recited in claim 6 further comprising:
discarding said binary segmentation in response to said smallest rectangle that encloses all foreground pixels not overlapping with said bounding box by at least said threshold percentage.

8. The method as recited in claim 3 further comprising:
discarding regions in said frame where a bounding box contains more than a threshold percentage of pixels labeled as foreground.

9. The method as recited in claim 3 further comprising:
discarding said binary segmentation in response to a generic object and background lacking distinct optical flow.

10. A computer program product for segmenting generic objects in videos, the computer program product comprising a computer readable storage medium having program code embodied therewith, the program code comprising the programming instructions for:
processing an appearance stream of an image in a frame of a video using a first deep neural network;
processing a motion stream of an optical flow image in said frame of said video using a second deep neural network; and
joining said processed appearance stream and said processed motion stream to combine complementary appearance and motion information to perform video segmentation of generic objects in said frame of said video.

11. The computer program product as recited in claim 10, wherein the program code further comprises the programming instructions for:
receiving annotations of a foreground map; and
using said appearance stream to generate a more precise version of said foreground map to be used as training data.

12. The computer program product as recited in claim 10, wherein the program code further comprises the programming instructions for:
mapping bounding boxes labeled for each generic object to each frame of said video; and
applying said appearance stream to said mapped bounding boxes to compute a binary segmentation for each frame of said video.

13. The computer program product as recited in claim 12, wherein the program code further comprises the programming instructions for:
deconflicting said mapped bounding boxes and said binary segmentation in each frame of said video.

14. The computer program product as recited in claim 12, wherein the program code further comprises the programming instructions for:
refining said binary segmentation by setting all pixels outside said bounding boxes as background.

15. The computer program product as recited in claim 12, wherein the program code further comprises the programming instructions for:
determining if a smallest rectangle that encloses all foreground pixels overlaps with a bounding box by at least a threshold percentage.

16. The computer program product as recited in claim 15, wherein the program code further comprises the programming instructions for:
discarding said binary segmentation in response to said smallest rectangle that encloses all foreground pixels not overlapping with said bounding box by at least said threshold percentage.

17. The computer program product as recited in claim 12, wherein the program code further comprises the programming instructions for:
discarding regions in said frame where a bounding box contains more than a threshold percentage of pixels labeled as foreground.

18. The computer program product as recited in claim 12, wherein the program code further comprises the programming instructions for:
discarding said binary segmentation in response to a generic object and background lacking distinct optical flow.

19. A system, comprising:
a memory unit for storing a computer program for segmenting generic objects in videos; and
a processor coupled to the memory unit, wherein the processor is configured to execute the program instructions of the computer program comprising:
processing an appearance stream of an image in a frame of a video using a first deep neural network;
processing a motion stream of an optical flow image in said frame of said video using a second deep neural network; and
joining said processed appearance stream and said processed motion stream to combine complementary appearance and motion information to perform video segmentation of generic objects in said frame of said video.

20. The system as recited in claim 19, wherein the program instructions of the computer program further comprise:
receiving annotations of a foreground map; and
using said appearance stream to generate a more precise version of said foreground map to be used as training data.

21. The system as recited in claim 19, wherein the program instructions of the computer program further comprise:
mapping bounding boxes labeled for each generic object to each frame of said video; and
applying said appearance stream to said mapped bounding boxes to compute a binary segmentation for each frame of said video.

22. The system as recited in claim 21, wherein the program instructions of the computer program further comprise:
deconflicting said mapped bounding boxes and said binary segmentation in each frame of said video.

23. The system as recited in claim 21, wherein the program instructions of the computer program further comprise:
  refining said binary segmentation by setting all pixels outside said bounding boxes as background.

24. The system as recited in claim 21, wherein the program instructions of the computer program further comprise:
  determining if a smallest rectangle that encloses all foreground pixels overlaps with a bounding box by at least a threshold percentage.

25. The system as recited in claim 24, wherein the program instructions of the computer program further comprise:
  discarding said binary segmentation in response to said smallest rectangle that encloses all foreground pixels not overlapping with said bounding box by at least said threshold percentage.

26. The system as recited in claim 21, wherein the program instructions of the computer program further comprise:
  discarding regions in said frame where a bounding box contains more than a threshold percentage of pixels labeled as foreground.

27. The system as recited in claim 21, wherein the program instructions of the computer program further comprise:
  discarding said binary segmentation in response to a generic object and background lacking distinct optical flow.

* * * * *